(12) United States Patent
Hanaoka

(10) Patent No.: US 11,572,436 B2
(45) Date of Patent: Feb. 7, 2023

(54) CURING AGENT FOR WATER-BASED EPOXY RESIN, WATER-BASED EPOXY RESIN COMPOSITION, AND CURED PRODUCT THEREOF

(71) Applicant: MITSUBISHI GAS CHEMICAL COMPANY, INC., Tokyo (JP)

(72) Inventor: Takuma Hanaoka, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 0 days.

(21) Appl. No.: 17/042,099

(22) PCT Filed: Apr. 10, 2019

(86) PCT No.: PCT/JP2019/015566
§ 371 (c)(1),
(2) Date: Sep. 26, 2020

(87) PCT Pub. No.: WO2019/225186
PCT Pub. Date: Nov. 28, 2019

(65) Prior Publication Data
US 2021/0054135 A1 Feb. 25, 2021

(30) Foreign Application Priority Data
May 24, 2018 (JP) .............................. JP2018-099699

(51) Int. Cl.
| C08G 59/54 | (2006.01) |
| C08G 59/50 | (2006.01) |
| C09D 5/08 | (2006.01) |
| C09D 163/00 | (2006.01) |

(52) U.S. Cl.
CPC ......... *C08G 59/54* (2013.01); *C08G 59/5033* (2013.01); *C09D 5/08* (2013.01); *C09D 163/00* (2013.01)

(58) Field of Classification Search
CPC ...... C08G 59/54; C08G 59/5033; C09D 5/08; C09D 163/00
USPC ....................................................... 524/845
See application file for complete search history.

(56) References Cited

U.S. PATENT DOCUMENTS

| 5,356,961 A | 10/1994 | Nishimura et al. |
| 5,798,398 A | 8/1998 | Shah et al. |
| 2017/0218114 A1 | 8/2017 | Kasemi et al. |
| 2018/0327629 A1 | 11/2018 | Tomura et al. |
| 2019/0112416 A1 | 4/2019 | Sato et al. |
| 2019/0256645 A1 | 8/2019 | Asai et al. |

FOREIGN PATENT DOCUMENTS

| CN | 106715515 A | 5/2017 | |
| CN | 106987194 A | 7/2017 | |
| CN | 109843969 A | 6/2019 | |
| EP | 1 452 554 A1 | 9/2004 | |
| JP | 5-178967 A | 7/1993 | |
| JP | 2001-502378 A | 2/2001 | |
| JP | 2002-80564 A | 3/2002 | |
| JP | 2004-196945 A | 7/2004 | |
| JP | 2006-70125 A | 3/2006 | |
| JP | 2017-025158 A | 2/2017 | |
| JP | 2017052686 A | * 3/2017 | ............ C04B 26/14 |
| JP | 2018-16672 A | 2/2018 | |
| WO | 2013/131776 A1 | 9/2013 | |
| WO | 2015/027420 A1 | 3/2015 | |
| WO | 2016/088528 A1 | 6/2016 | |
| WO | 2017/175740 A1 | 10/2017 | |

OTHER PUBLICATIONS

Yamanaka et al., JP 2017-052686 A machine translation in English, Mar. 16, 2017 (Year: 2017).*
International Search Report issued in International Patent Application No. PCT/JP2019/015566, dated Jul. 16, 2019, along with an English translation thereof.

* cited by examiner

*Primary Examiner* — David T Karst
(74) *Attorney, Agent, or Firm* — Greenblum & Bernstein, P.L.C.

(57) ABSTRACT

Provided is a curing agent for a water-based epoxy resin, which contains the following component (A) and component (B):

(A); at least one selected from the group consisting of a polyamide amine-based curing agent (a1), a reaction product (a2) of a polyamine compound and a polyepoxy compound, and a Mannich reaction product (a3) of a polyamine compound, a phenol compound, and an aldehyde compound;

(B): at least one selected from the group consisting of a reaction product (b1) of styrene and an amine compound represented by the following formula (1), and a reaction product (b2) of epichlorohydrin and an amine compound represented by the following formula (1);

$$H_2N-CH_2-A-CH_2-NH_2 \qquad (1)$$

wherein A is a 1,2-phenylene group, a 1,3-phenylene group, or a 1,4-phenylene group.

7 Claims, No Drawings

CURING AGENT FOR WATER-BASED EPOXY RESIN, WATER-BASED EPOXY RESIN COMPOSITION, AND CURED PRODUCT THEREOF

TECHNICAL FIELD

The present invention relates to a water-based epoxy resin curing agent, a water-based epoxy resin composition, and a cured product thereof.

BACKGROUND ART

A polyamine, and a compound obtained by subjecting a polyamine and an alkenyl compound, an epoxy compound, or the like to addition reaction are known to be useful as an epoxy resin curing agent. An epoxy resin composition using the epoxy resin curing agent has been widely used in the paint fields, such as a corrosion-resistant paint for ships, bridges, iron structures on land and sea, in the civil engineering construction fields, such as lining, reinforcement, crack repair materials, sealing materials, injection materials, primers, screeds, topcoats and FRP reinforcement of concrete structures, floor materials of buildings, lining of water supply and sewage systems, paving materials, and adhesives, in the electrical and electronic fields, such as die-attach materials and insulation sealants, and in the fiber reinforced plastic fields.

In the paint fields, solvent regulation has been recently strengthened in terms of environment and safety, so that studies on water-based production of paint have been underway. The water-based production of an epoxy resin-based paint is to use, for example, as a main agent, a water-based epoxy resin emulsified by adding an emulsifier and water to an epoxy resin.

PTL 1 discloses an epoxy curing reagent composition including an epichlorohydrin-metaxylylene diamine reaction product which does not substantially contain metaxylylene diamine, and at least one liquid hydroxyl-functional melting point depressant selected from the group including plasticizer alcohol and aqueous alcohol solvents, and a use of the epoxy curing reagent composition in combination with an epoxy resin aqueous dispersion.

PTL 2 discloses an asphalt composition containing a water-based epoxy resin and a phenalkamine composition which is a polyamide amine.

CITATION LIST

Patent Literature

PTL 1: JP 2001-502378 A
PTL 2: WO 2015/027420

SUMMARY OF INVENTION

Technical Problem

In a water-based epoxy resin composition, it is common to combine a highly hydrophilic curing agent with a water-based epoxy resin as the main agent. However, such a water-based epoxy resin composition does not always have sufficient performance in terms of curing rate and the hardness and chemical resistance of a coating film. Even among chemical resistance properties, when a water-based epoxy resin composition is used for a paint for corrosion resistance, it is important that the appearance of the water-based epoxy resin composition does not change much even when exposed to salt water for a long time and that rust can be prevented from occurring on the surface to be coated.

A problem to be solved by the present invention is to provide a water-based epoxy resin composition which does not contain a solvent, is also suitable in terms of environment or safety, has good curability, and is also excellent in coating film performance such as hardness and chemical resistance, particularly salt water corrosion resistance; a cured product thereof; and a curing agent for a water-based epoxy resin, which is to be used for the water-based epoxy resin composition.

Solution to Problem

The present inventor has found that a curing agent for an epoxy resin, containing a curing agent component having a predetermined structure may solve the above problem.

The present invention relates to the following [1] to [8].

[1] A curing agent for a water-based epoxy resin, which contains the following component (A) and component (B):

(A); at least one selected from the group consisting of a polyamide amine-based curing agent (a1), a reaction product (a2) of a polyamine compound and a polyepoxy compound, and a Mannich reaction product (a3) of a polyamine compound, a phenol compound, and an aldehyde compound;

(B): at least one selected from the group consisting of a reaction product (b1) of styrene and an amine compound represented by the following formula (1), and a reaction product (b2) of epichlorohydrin and an amine compound represented by the following formula (1);

$$H_2N-CH_2\text{-}A\text{-}CH_2-NH_2 \qquad (1)$$

wherein A is a 1,2-phenylene group, a 1,3-phenylene group, or a 1,4-phenylene group.

[2] The curing agent for a water-based epoxy resin described in [1], wherein the reaction product (b1) contains 10% by mass or more of a compound represented by the following formula (2):

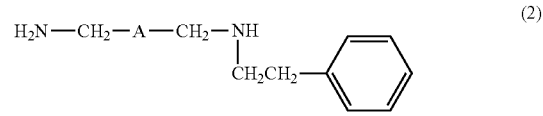

wherein A is the same as defined above.

[3] The curing agent for a water-based epoxy resin described in [1], wherein the reaction product (b2) contains a compound represented by the following formula (3) as a main component;

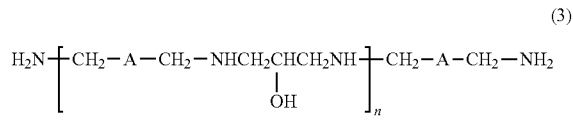

wherein A is the same as defined above, and n is a number of 1 to 12.

[4] The curing agent for a water-based epoxy resin described in any one of [1] to [3], wherein a content ratio between the component (A) and the component (B) is 99/1 to 70/30 by mass ratio.

[5] The curing agent for a water-based epoxy resin described in [4], wherein a content ratio between the component (A) and the component (B) is 95/5 to 90/10 by mass ratio.

[6] A water-based epoxy resin composition containing the curing agent for a water-based epoxy resin described in any one of [1] to [5] and a water-based epoxy resin.

[7] A paint for corrosion resistance containing the water-based epoxy resin composition described in [6].

[8] A cured product of the water-based epoxy resin composition described in [6].

Advantageous Effects of Invention

By using a curing agent for a water-based epoxy resin of the present invention, a water-based epoxy resin composition can be provided, which does not contain a solvent, is also suitable in terms of environment or safety, has good curability, and is also excellent in coating film performance such as hardness and chemical resistance, particularly salt water corrosion resistance. The water-based epoxy resin composition can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like.

DESCRIPTION OF EMBODIMENTS

[Curing Agent for Water Based Epoxy Resin]

A curing agent for a water-based epoxy resin of the present invention (hereinafter, also simply referred to as "the curing agent of the present invention") is characterized by containing the following component (A) and component (B).

(A): at least one selected from the group consisting of a polyamide amine-based curing agent (a1), a reaction product (a2) of a polyamine compound and a polyepoxy compound, and a Mannich reaction product (a3) of a polyamine compound, a phenol compound, and an aldehyde compound;

(B): at least one selected from the group consisting of a reaction product (b1) of styrene and an amine compound represented by the following formula (1), and a reaction product (b2) of epichlorohydrin and an amine compound represented by the following formula (1).

$$H_2N-CH_2\text{-}A\text{-}CH_2-NH_2 \qquad (1)$$

wherein A is a 1,2-phenylene group, a 1,3-phenylene group, or a 1,4-phenylene group.

By containing the above-described component (A) and component (B), the curing agent of the present invention provides good curability of a water-based epoxy resin composition to be obtained by blending the components, and excellent hardness and chemical resistance, particularly salt water corrosion resistance of a coating film. Further, the water resistance, impact resistance, and appearance of a coating film of an epoxy resin composition to be obtained are maintained or better as compared with when the component (A) is used alone as a curing agent, and economic feasibility is better than when the component (B) is used alone as a curing agent.

The "water-based epoxy resin" in the present specification refers to an aqueous epoxy resin, or an epoxy resin usable in an aqueous dispersion state (emulsion). The water-based epoxy resin will be described below, but as the water-based epoxy resin used in the present invention, an epoxy resin emulsion is preferred.

Hereinafter, each component constituting the curing agent of the present invention will be described.

<Component (A)>

The curing agent of the present invention contains, as the component (A), at least one selected from the group consisting of a polyamide amine-based curing agent (a1), a reaction product (a2) of a polyamine compound and a polyepoxy compound, and a Mannich reaction product (a3) of a polyamine compound, a phenol compound, and an aldehyde compound. By containing these curing agents or reaction products as the component (A), the curing agent of the present invention is a curing agent for a water-based epoxy resin that has excellent economic feasibility and high versatility.

(Polyamide Amine-Based Curing Agent (a1))

The polyamide amine-based curing agent (a1) used in the present invention is not particularly limited as long as it is a curing agent containing a compound (polyamide amine compound) that has a polyamide structure in the molecule and has at least two active hydrogens. In the present specification, "active hydrogen" refers to hydrogen bonded to a nitrogen atom of an amino group in a polyamide amine compound and a polyamine compound.

A general method can be used as the method for producing the polyamide amine compound used for the polyamide amine-based curing agent. For example, the polyamide amine compound can be obtained by a condensation reaction between a polyamine compound and a polycarboxylic acid compound. At this time, the amount of active hydrogens in the obtained polyamide amine compound can be adjusted by adjusting the ratio of the polyamine compound and the polycarboxylic acid compound used in the reaction.

The polyamine compound used for producing the polyamide amine compound is not particularly limited as long as it is a compound having at least two amino groups in the molecule. As the polyamine compound, at least one selected from the group consisting of aliphatic chain polyamines, aliphatic cyclic polyamines, and aromatic polyamines can be used. As the aliphatic chain polyamine, it is also preferable to use a polyalkylene polyamine such as diethylene triamine, triethylene tetramine and tetraethylene pentamine.

The polycarboxylic acid compound used for producing the polyamide amine compound is not particularly limited as long as it is a compound having at least two carboxy groups in the molecule, but is preferably a dicarboxylic acid such as an aliphatic dicarboxylic acid or a dimer acid.

In the production of the polyamide amine compound, in addition to the polyamine compound and the polycarboxylic acid compound, an aminocarboxylic acid compound, a polyol compound, a lactam compound, and the like may be appropriately reacted to obtain a modified polyamide amine compound.

The polyamide amine-based curing agent (a1) may contain water or an aqueous solvent in addition to the polyamide amine compound. Examples of the aqueous solvent include protic polar solvents such as methanol, ethanol, 1-propanol, 2-propanol, 1-butanol, 2-butanol, 2-methoxyethanol, 2-ethoxyethanol, 2-propoxyethanol, 2-butoxyethanol, 1-methoxy- 2-propanol, 1-ethoxy-2-propanol, and 1-propoxy-2-propanol, aprotic polar solvents such as N,N-dimethylformamide, N, N-dimethylacetamide, dimethylsulfoxide, and N-methylpyrrolidone, and the like. These aqueous solvents may be used either alone or in combination of two or more thereof. Among them, it is preferable that the polyamide amine-based curing agent (a1) contains water.

The solid content concentration of the polyamide amine-based curing agent (a1) is preferably 25% by mass or more, and more preferably 30% by mass or more. Further, the upper limit thereof is 100% by mass.

As the polyamide amine-based curing agent (a1), a commercially available polyamide amine-based curing agent can be used. Examples of such a polyamide amine-based curing agent include "Aradur 3986" manufactured by Huntsman Advanced Materials, Inc., "WD11M60" manufactured by Mitsubishi Chemical Corporation, "TXS-53-C", "TXH-674-B", and "TXH-685-A" manufactured by T&K TOKA Co., Ltd., and the like. These polyamide amine-based curing agents can be used either alone or in combination of two or more thereof.

(Reaction Product (a2))

The reaction product (a2) used in the present invention is a reaction product of a polyamine compound and a polyepoxy compound.

The polyamine compound used for producing the reaction product (a2) is not particularly limited as long as it is a compound having at least two amino groups in the molecule. Examples thereof include 1,2-bis(aminomethyl)cyclohexane, 1,3-bis(aminomethyl)cyclohexane, 1,4-bis(aminomethyl)cyclohexane, orthoxylylene diamine, metaxylylene diamine (MXDA), paraxylylene diamine (PXDA), menthene diamine, isophorone diamine (IPDA), diaminodicyclohexylmethane, bis(4-amino-3-methylcyclohexyl)methane, N-aminomethylpiperazine, norbornane diamine, bis(aminomethyl)tricyclodecane, ethylenediamine, diethylenetriamine, triethylenetetramine, tetraethylenepentamine, pentaethylenehexamine, polyoxyalkylenediamine, polyoxyalkylenetriamine, and the like. These polyamine compounds may be used either alone or in combination of two or more thereof.

Among them, from the viewpoint of improving the rate of dry to the touch, the water resistance, and the chemical resistance of a coating film of a water-based epoxy resin composition, the polyamine compound used for producing the reaction product (a2) is preferably at least one selected from the group consisting of 1,2-bis(aminomethyl)cyclohexane, 1,3-bis(aminomethyl)cyclohexane, 1,4-bis(aminomethyl)cyclohexane, orthoxylylene diamine, metaxylylene diamine (MXDA), paraxylylene diamine (PXDA), menthene diamine, and isophorone diamine (IPDA).

The polyepoxy compound used for producing the reaction product (a2) is not particularly limited as long as it is a compound having at least two epoxy groups in the molecule.

Specific examples of the polyepoxy compound include 1,3-propanediol diglycidyl ether, 1,4-butanediol diglycidyl ether, 1,5-pentanediol diglycidyl ether, neopentyl glycol diglycidyl ether, 1,6-hexanediol diglycidyl ether, biphenol diglycidyl ether, dihydroxy naphthalene diglycidyl ether, dihydroxy anthracene diglycidyl ether, triglycidyl isocyanurate, tetraglycidyl glycoluril, a polyfunctional epoxy resin having a glycidyl amino group derived from metaxylylene diamine, a polyfunctional epoxy resin having a glycidyl amino group derived from 1,3-bis(aminomethyl)cyclohexane, a polyfunctional epoxy resin having a glycidyl amino group derived from diaminodiphenylmethane, a polyfunctional epoxy resin having a glycidyl amino group and a glycidyloxy group derived from paraaminophenol, a polyfunctional epoxy resin having a glycidyloxy group derived from bisphenol A, a polyfunctional epoxy resin having a glycidyloxy group derived from bisphenol F, a polyfunctional epoxy resin having a glycidyloxy group derived from phenol novolac, a polyfunctional epoxy resin having two or more glycidyloxy groups derived from resorcinol, and the like. These compounds may be used either alone or in combination of two or more thereof. Further, "polyfunctional epoxy resin" means an epoxy resin having two or more epoxy groups in the molecule.

In terms of rate of dry to the touch, the water resistance, and the chemical resistance of a coating film of a water-based epoxy resin composition to be obtained, as a polyepoxy compound, a compound including an aromatic ring or an alicyclic structure in the molecule thereof is more preferred, a compound including an aromatic ring in the molecule thereof is even more preferred, and a polyfunctional epoxy resin having a glycidyloxy group derived from bisphenol A is still even more preferred.

The reaction product (a2) is obtained by reacting the polyamine compound and the polyepoxy compound. The reaction may be performed by a well-known method, and the method is not particularly limited, but examples thereof include a method of charging a polyamine compound in a reactor, adding the polyepoxy compound by a whole addition or a divided addition such as dropwise addition, and heating and reacting the mixture. It is preferred that the addition reaction is performed under an inert atmosphere such as a nitrogen gas.

From the viewpoint that the reaction product (a2) exhibits a function as a curing agent for an epoxy resin, it is preferred that in the reaction, an excessive amount of polyamine compound is used with respect to an epoxy equivalent weight of the polyepoxy compound. Specifically, when [D] indicates the number of active hydrogens of the polyamine compound and [G] indicates the number of epoxy groups of the polyepoxy compound, the polyamine compound and the polyepoxy compound are used so as to become [D]/[G]=50 to 4 and more preferably [D]/[G]=20 to 8. Within this range, the handleability becomes excellent without the viscosity of the reaction product (a2) becoming excessively high, and, the curability of the water-based epoxy resin composition to be obtained and the hardness, chemical resistance, impact resistance and the like of a coating film are also good.

The temperature and the time for the reaction at the time of the reaction may be appropriately selected according to the types of polyamine compound and polyepoxy compound used, and the like. From the viewpoint of the reaction rate and the productivity, and prevention of decomposition of the starting material, and the like, the temperature at the time of the reaction is preferably 50 to 150° C. and more preferably 70 to 120° C. Further, the time for the reaction is preferably 0.5 to 12 hours and more preferably 1 to 6 hours after the addition of the polyepoxy compound is completed.

The reaction product (a2) may contain a polyamine compound and a polyepoxy compound as unreacted starting materials. From the viewpoint of the water resistance of a coating film of a water-based epoxy resin composition to be obtained, it is preferable that the content of unreacted starting materials is small, for example, 30% by mass or less.

In the present specification, the content of unreacted starting material in each reaction product can be determined by gas chromatography (GC) analysis.

(Reaction Product (a3))

The reaction product (a3) used in the present invention is a Mannich reaction product of a polyamine compound, a phenol compound, and an aldehyde compound.

The polyamine compound used for producing the reaction product (a3) is not particularly limited as long as it is a compound having at least two amino groups in the molecule. The polyamine compound and a preferred aspect thereof are the same as those of the polyamine compound used in the production of the reaction product (a2).

Examples of the phenol-based compound used for producing the reaction product (a3) include phenol, cresol, p-ethylphenol, o-isopropylphenol, p-isopropylphenol, p-tert-butylphenol, p-sec-butylphenol, o-tert-butylphenol, o-sec-butylphenol, p-tert-amylphenol, o-tert-amylphenol, p-octylphenol, nonylphenol, p-cumylphenol, decylphenol, undecylphenol, p-dodecylphenol, tridecylphenol, tetradecylphenol, pentadecylphenol, pentadecenylphenol, pentadecadienylphenol, pentadecatrienylphenol, hexadecylphenol, heptadecylphenol, octadecylphenol, octadecenylphenol, terpenephenol, and furthermore, a phenol compound naturally produced, such as cardanol. These compounds may be used either alone or in combination of two or more thereof. Among the compounds, as the phenol-based compound used for producing the reaction product (a3), at least one selected from the group consisting of phenol, cresol, p-tert-butylphenol, nonylphenol, and cardanol are preferred.

Examples of the aldehyde compound used for producing the reaction product (a3) include: formaldehyde; a formaldehyde-releasing compound such as trioxane and paraformaldehyde; and other aldehydes such as benzaldehyde. Among them, at least one selected from the group consisting of formaldehyde and a formaldehyde-releasing compound are preferred. Among them, from the viewpoint of workability in the Mannich reaction, it is more preferred that an aqueous formaldehyde solution is used.

The reaction product (a3) is preferably a reaction product obtained by subjecting at least one polyamine compound selected from the group consisting of 1,2-bis(aminomethyl) cyclohexane, 1,3-bis(aminomethyl) cyclohexane, 1,4-bis (aminomethyl)cyclohexane, orthoxylylene diamine, metaxylylene diamine, paraxylylene diamine, menthene diamine, and isophorone diamine, at least one phenol-based compound selected from the group consisting of phenol, cresol, p-tert-butylphenol, nonylphenol, and cardanol, and at least one aldehyde compound selected from the group consisting of formaldehyde and formaldehyde-releasing compounds to a Mannich reaction. More preferably, the reaction product (a3) is a reaction product obtained by subjecting metaxylylene diamine, at least one phenol-based compound selected from the group consisting of phenol and p-tert-butylphenol, and formaldehyde to a Mannich reaction.

A method for producing the reaction product (a3) is not particularly limited, and a well-known method may be used. Examples thereof include a method of adding an aldehyde compound or a solution thereof to a mixture of a polyamine compound and a phenol-based compound at preferably 80° C. or less and more preferably 60° C. or less by dropwise addition, and the like, and allowing a reaction system to react for 1 to 10 hours while removing a distillate from the reaction system by increasing the temperature to preferably 80 to 180° C. and more preferably 90 to 150° C. after the addition is completed.

The amounts of the polyamine compound, phenol-based compound, and aldehyde compound used in the Mannich reaction are not particularly limited as long as the amounts are in a ratio at which an active hydrogen remains in the reaction product (a3) to be obtained, but are preferably within the following range.

The aldehyde compound is used within a range of preferably 0.3 to 2 mol and more preferably 0.5 to 1.5 mol with respect to 1 mol of the polyamine compound. When the amount of the aldehyde compound used with respect to 1 mol of the polyamine compound is 0.3 mol or more, the addition reaction is sufficiently performed, and when the amount thereof is 2 mol or less, the viscosity of a reaction product to be obtained does not become excessively high, so that the workability becomes good. Further, the phenol-based compound is used within a range of preferably 0.3 to 2 mol and more preferably 0.5 to 1.5 mol with respect to 1 mol of the polyamine compound. When the amount of phenol-based compound used with respect to 1 mol of the polyamine compound is 0.3 mol or more, the appearance of a coating film to be obtained becomes good, and when the amount thereof is 2 mol or less, curability as the epoxy resin curing agent is good.

The reaction product (a3) may contain a polyamine compound, a phenol compound, and an aldehyde compound as unreacted starting materials. From the viewpoint of the water resistance of a coating film of a water-based epoxy resin composition to be obtained, it is preferable that the content of unreacted starting materials is small, for example, 30% by mass or less.

As the component (A), any one of the above-described (a1) to (a3) may be used, or two or more thereof may be used in combination.

An active hydrogen equivalent weight of the component (A) is preferably 800 or less, and more preferably 500 or less. The active hydrogen equivalent weight (hereinafter, also referred to as "AHEW") is the molecular weight per active hydrogen equivalent weight in the curing agent that can react with the epoxy resin, which is the main agent of the epoxy resin composition. When the active hydrogen equivalent weight of the component (A) is low, a high curability is exhibited even though the blending amount in the water-based epoxy resin composition is small.

The AHEW of the component (A) is preferably 50 or more, and more preferably 100 or more, from the viewpoint of ease of production, and the like. The AHEW of the component (A) may be obtained by a titration method, for example.

In the present specification, "active hydrogen equivalent weight of component (A)" is, when two or more components are used as the component (A), the active hydrogen equivalent weight of the entire component (A) composed of two or more components. Further, when the component (A) is used in the form of a solution or a dispersion, the as-is active hydrogen equivalent weight is preferably within the above range.

<Component (B)>

The curing agent of the present invention contains, as the component (B), at least one selected from the group consisting of a reaction product (b1) of styrene and an amine compound represented by the following formula (1), and a reaction product (b2) of epichlorohydrin and an amine compound represented by the following formula (1):

H$_2$N—CH$_2$-A-CH$_2$—NH$_2$     (1)

wherein A is a 1,2-phenylene group, a 1,3-phenylene group, or a 1,4-phenylene group.

When the curing agent of the present invention contains the above-described reaction product as the component (B), the curability of a water-based epoxy resin composition to be obtained is good, and the hardness and chemical resistance, particularly salt water corrosion resistance of a coating film are excellent. Further, the water resistance, impact resistance, and appearance of a coating film to be obtained are maintained or better as compared to when the component (A) is used alone as a curing agent.

(Reaction Product (b1))

The reaction product (b1) is a reaction product of styrene and an amine compound represented by the formula (1).

In the formula (1), A is preferably a 1,3-phenylene group or a 1,4-phenylene group, and more preferably a 1,3-phenylene group. That is, the amine compound represented by the formula (1) is at least one selected from the group consisting of orthoxylylene diamine, metaxylylene diamine (MXDA), and paraxylylene diamine (PXDA), one or more selected from the group consisting of metaxylylene diamine and paraxylylene diamine is preferred, and metaxylylene diamine is more preferred.

From the viewpoint of improving the curability of the water-based epoxy resin composition to be obtained and the hardness and chemical resistance of a coating film, it is preferred that the reaction product (b1) contain 10% by mass or more of a compound represented by the following formula (2).

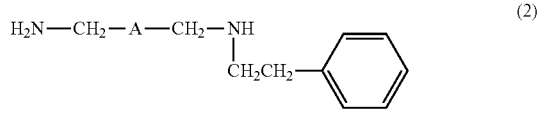

(2)

wherein A is the same as defined above.

The compound represented by the formula (2) is, of reaction products of styrene and the amine compound represented by the formula (1) (hereinafter also referred to as "starting material diamine"), a reaction product in which 1 mol of styrene and 1 mol of the starting material diamine are added (hereinafter also referred to as "1:1 adduct").

The reaction product (b1) may contain, in addition to the 1:1 adduct of styrene and a starting material diamine, a multi-adduct such as a 2:1 adduct, a 3:1 adduct, and a 4:1 adduct of styrene and the starting material diamine and the like. Among the above adducts, the 1:1 adduct of styrene and the starting material diamine has the lowest active hydrogen equivalent weight. Therefore, a curing agent for a water-based epoxy resin using a reaction product (b1) containing a large amount of 1:1 adduct can exhibit a good curing performance even if the blending amount in the water-based epoxy resin composition is small.

From the viewpoint of obtaining the above-described effect, the content of the compound represented by the formula (2) in the reaction product (b1) is more preferably 20% by mass or more, even more preferably 30% by mass or more, and still even more preferably 45% by mass or more. Further, the upper limit is 100% by mass.

A content of the compound represented by the formula (2) in the reaction product (b1) may be obtained by a GC analysis.

An active hydrogen equivalent weight (AHEW) of the reaction product (b1) is preferably 130 or less, more preferably 120 or less, and even more preferably 110 or less. When the AHEW of the reaction product (b1) is 130 or less, the reaction product (b1) exhibits good curing performance even though the amount of curing agent blended in a water-based epoxy resin composition is small when the reaction product (b1) is used in a curing agent for a water-based epoxy resin. The AHEW of the reaction product (b1) is preferably 80 or more, and more preferably 90 or more from the viewpoint of ease of production, and the like.

The AHEW of the reaction product (b1) can be obtained by the same method as described above.

Further, a content of the amine compound represented by the formula (1) in the reaction product (b1) is preferably 5% by mass or less, more preferably 2% by mass or less, and even more preferably 1% by mass or less. When the content of the amine compound (raw material diamine) represented by the formula (1) in the reaction product (b1) is smaller, the water resistance of a coating film prepared by using a water-based epoxy resin composition in combination with a curing agent containing the reaction product (b1) is more improved.

The reaction product (b1) is obtained by subjecting styrene and an amine compound represented by the formula (1) to an addition reaction.

The addition reaction of styrene and the raw material diamine may be performed by a well-known method, and the method is not particularly limited, but it is preferred that the addition reaction is performed in the presence of a basic catalyst from the viewpoint of reaction efficiency. Examples of the basic catalyst include an alkali metal, an alkali metal amide (which is represented by formula MNRR' where M is an alkali metal, N is nitrogen, and R and R' are each independently hydrogen or an alkyl group), an alkylated alkali metal, and the like, and are preferably an alkali metal amide. Among them, as the basic catalyst, lithium amide (LiNH$_2$) is preferred.

In the addition reaction of styrene and the raw material diamine, an amount of basic catalyst used is preferably 0.1 to 20 mol %, more preferably 0.5 to 15 mol %, even more preferably 1.0 to 12 mol %, and still even more preferably 1.5 to 10 mol % based on 100 mol % of the total amount of the raw material diamine and styrene, which are used. When the amount of basic catalyst used is 0.1 mol % or more, the addition reaction rate is good, and when the amount of basic catalyst used is 20 mol % or less, the amount is economically advantageous.

For an amount of styrene and raw material diamine used in the addition reaction, from the viewpoint of obtaining the compound represented by the formula (2) at a high selectivity, a molar ratio of styrene to 1 mol of the raw material diamine ranges preferably from 0.1 to 5.0 mol, more preferably from 0.4 to 3.0 mol, even more preferably from 0.5 to 1.5 mol, and still even more preferably from 0.8 to 1.2 mol.

It is preferred that the addition reaction of styrene and the raw material diamine is performed by bringing the raw material diamine and a basic catalyst into contact with each other in advance to perform a preliminary reaction, and then adding styrene thereto. By performing the preliminary reaction, the activity of the raw material diamine is increased, and the addition reaction with the styrene is efficiently performed. The preliminary reaction of the raw material diamine and the basic catalyst may be performed, for example, by charging the raw material diamine and the basic catalyst into a reactor, and heating the mixture while stirring the mixture under an inert atmosphere such as a nitrogen gas.

The temperature at the time of the preliminary reaction of the raw material diamine and the basic catalyst is preferably 50 to 140° C., and more preferably 70 to 100° C. When the preliminary reaction temperature is 50° C. or more, the raw material diamine is sufficiently activated, so that the subsequent addition reaction is efficiently performed. In addition, when the preliminary reaction temperature is 140° C. or less, it is possible to avoid the heat deterioration and the like of the raw material diamine.

The time for the preliminary reaction is preferably 20 to 360 minutes, and more preferably 30 to 120 minutes. When the time for the preliminary reaction is 20 minutes or more, the raw material diamine is sufficiently activated, so that the subsequent addition reaction is efficiently performed. Furthermore, when the time is 360 minutes or less, the time is advantageous in terms of productivity.

The preliminary reaction of the raw material diamine and the basic catalyst is performed, and then styrene is added thereto to perform an addition reaction with the raw material diamine. The method for adding styrene is not particularly limited, but it is preferred that the styrene is added dividedly from the viewpoint of suppressing production of a polymeric product of styrene. Examples of the divided addition method include a method for adding styrene into a reactor by using a dropping funnel or a liquid feeding pump, and the like.

The temperature at the time of adding styrene, and at the time of the addition reaction is preferably 50 to 120° C., and more preferably 70 to 100° C. When the reaction temperature is 50° C. or more, the addition reaction of styrene and the raw material diamine is efficiently performed. Further, when the reaction temperature is 120° C. or less, it is possible to suppress production of a polymeric product of styrene, which is a byproduct.

In addition, the time for the addition reaction is not particularly limited, and may be appropriately selected according to the type of catalyst used, the reaction condition, and the like. For example, the time for the addition reaction may be set to a time until an amount of unreacted styrene becomes 1% by mass or less by performing a sampling of the reaction solution during the addition reaction, and performing the quantification of unreacted styrene with gas chromatography, liquid chromatography, or the like. Typically, the time for the addition reaction is preferably 10 to 180 minutes, and more preferably 20 to 120 minutes after the addition of styrene is completed. When the time for the addition reaction is 10 minutes or more, an amount of unreacted raw material remaining is small, and when the time for the addition reaction is 180 minutes or less, the time is advantageous in terms of productivity.

The obtained reaction liquid contains a reaction product of styrene and a starting material diamine and a basic catalyst. Further, unreacted raw material diamine and unreacted styrene are also included in some cases.

The basic catalyst may be removed by filtration, washing, adsorption, and the like according to the type thereof. For example, when the basic catalyst is an alkali metal amide, the alkali metal amide is changed into an easily removable salt by adding an acid such as hydrochloric acid, hydrogen chloride gas, and acetic acid, an alcohol such as methanol and ethanol, water, or the like thereto, and then the salt can be filtered. For example, when water is used, the alkali metal amide becomes a hydroxide, which is easily filtered.

After the basic catalyst is removed from the reaction solution as described above, a reaction product (b1) may be obtained by removing unreacted raw material diamine and unreacted styrene by distillation. By this operation, the content of the amine compound (raw material diamine) represented by the formula (1) in the reaction product (b1) may be preferably 1% by mass or less.

(Reaction Product (b2))

The reaction product (b2) is a reaction product of epichlorohydrin and an amine compound represented by the following formula (1).

The amine compound represented by the formula (1) in the reaction product (b2) and a preferred aspect thereof are the same as those of the amine compound used in the production of the reaction product (b1).

It is preferred that the reaction product (b2) contains a compound represented by the following formula (3) as a main component. The "main component" as referred to herein refers to a component whose content is 50% by mass or more based on 100% by mass of the entire constituent components in the reaction product (b2):

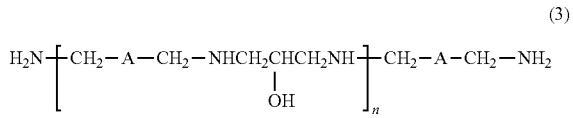

$$H_2N\left[CH_2-A-CH_2-NHCH_2\underset{OH}{CHCH_2}NH\right]_n CH_2-A-CH_2-NH_2 \quad (3)$$

wherein A is the same as defined above, and n is a number of 1 to 12.

The content of the compound represented by the formula (3) in the reaction product (b2) is preferably 60% by mass or more, and more preferably 70% by mass or more. The upper limit is 100% by mass.

In addition, from the viewpoint of obtaining good curing performance as the curing agent, a compound having a high ratio of a compound with n=1 occupied in the compound represented by the formula (3) is preferred. A content of the compound with n=1 represented by the formula (3) in the reaction product (b2) is preferably 15% by mass or more, and more preferably 20% by mass or more.

The content of the compound represented by the formula (3) in the reaction product (b2) and the composition of the compound represented by the formula (3) may be obtained by a GC analysis and a gel permeation chromatography (GPC) analysis.

An active hydrogen equivalent weight (AHEW) of the reaction product (b2) is preferably 100 or less, more preferably 90 or less, and even more preferably 80 or less. When the AHEW of the reaction product (b2) is 100 or less, the reaction product (b2) exhibits higher curability even though the amount of reaction product (b2) blended in the water-based epoxy resin composition is small. The AHEW of the reaction product (b2) is preferably 45 or more, and more preferably 50 or more, from the viewpoint of ease of production, and the like. The AHEW of the reaction product (b2) may be obtained by the method which is the same as defined above.

Further, the content of the amine compound represented by the formula (1) in the reaction product (b2) is preferably 35% by mass or less. When the content of the amine compound (starting material diamine) represented by the formula (1) in the reaction product (b2) is lower, the water resistance of a coating film of a water-based epoxy resin composition obtained using a curing agent containing the reaction product (b2) is better.

The reaction product (b2) is obtained by subjecting epichlorohydrin and the diamine (raw material diamine) represented by the formula (1) to reaction.

The reaction of epichlorohydrin and the raw material diamine may be performed by a well-known method, and the method is not particularly limited, but it is preferred that the reaction is performed in the presence of a basic catalyst from the viewpoint of reaction efficiency. As the basic catalyst, an alkali metal hydroxide is preferred, one or more selected from the group consisting of potassium hydroxide and sodium hydroxide are more preferred, and sodium hydroxide is even more preferred. The alkali metal hydroxide may be used in a solid state or in an aqueous solution state, but it is more preferred that the alkali metal hydroxide is used in an aqueous solution state. A concentration of the aqueous alkali metal hydroxide solution is preferably within a range of 30 to 55% by mass.

In the reaction of epichlorohydrin and the raw material diamine, an amount of basic catalyst used is preferably approximately equimolar to epichlorohydrin, and preferably 0.7 to 2.0 mol, more preferably 0.8 to 1.5 mol, and even more preferably 0.9 to 1.2 mol, with respect to 1 mol of epichlorohydrin used.

For the amounts of epichlorohydrin and the raw material diamine used in the addition reaction, from the viewpoint of obtaining a compound with n=1 among the compounds represented by the formula (3) at a high selectivity, a molar ratio of the raw material diamine to 1 mol of epichlorohydrin ranges preferably from 1.5 to 12 mol, more preferably 1.5 to 6.0 mol, and even more preferably from 1.8 to 3.0 mol.

It is preferred that the reaction of epichlorohydrin and the raw material diamine is performed by mixing the raw material diamine and the basic catalyst in advance, and continuously adding epichlorohydrin thereto. For example, the addition reaction is performed by charging the raw material diamine and the basic catalyst in a reactor, heating the mixture while stirring the mixture under an inert atmosphere such as a nitrogen gas, and adding epichlorohydrin thereto. The method for adding epichlorohydrin is not particularly limited, but examples thereof include a method for adding epichlorohydrin into a reactor by using a dropping funnel or a liquid feeding pump, and the like.

The temperature at the time of adding epichlorohydrin is preferably 40 to 100° C. and more preferably 50 to 80° C. After the addition of epichlorohydrin is completed, the reaction temperature may be increased in order to improve the reaction efficiency, and the temperature at the time of the reaction is preferably 55 to 120° C. When the reaction temperature is 55° C. or more, the addition reaction of epichlorohydrin and the raw material diamine is efficiently performed.

The time for the reaction is not particularly limited, and typically, is preferably 10 minutes to 6 hours and more preferably 20 minutes to 4 hours after the addition of epichlorohydrin is completed. When the time for the reaction is 10 minutes or more, an amount of unreacted raw material remaining is small, and when the time for the reaction is 6 hours or less, the time is advantageous in terms of productivity.

After completion of the reaction, the obtained reaction liquid contains a reaction product of epichlorohydrin and a starting material diamine, unreacted starting material diamine, a basic catalyst, and water and a salt produced by the reaction. For the salt, for example, when an alkali metal hydroxide is used as the basic catalyst, an alkali metal chloride is produced.

The basic catalyst may be removed by filtration, washing, adsorption, and the like according to the type thereof. The water produced by the reaction may be removed, for example, under a reduced pressure condition at a temperature of 100° C. or less. Further, the salt produced by the reaction may be removed by filtration, and the like.

The reaction product (b2) may be obtained by removing the basic catalyst, water, and the salt from the reaction solution as described above. Further, an operation of removing unreacted raw material diamine may be carried out, if necessary. By this operation, the content of the amine compound (raw material diamine) represented by the formula (1) in the reaction product (b2) may be reduced.

As the component (B), any of the reaction product (b1), the reaction product (b2), and a mixture thereof can be used. From the viewpoint of improving the corrosion resistance of a coating film of an epoxy resin composition to be obtained, the component (B) is more preferably the reaction product (b1), and from the viewpoint of curability and improving the hardness and impact resistance of a coating film of an epoxy resin composition to be obtained, the component (B) is more preferably the reaction product (b2).

(Content)

In a curing agent of the present invention, the content ratio between the component (A) and the component (B) is preferably 99/1 to 70/30 by mass ratio, more preferably 95/5 to 80/20, and even more preferably 95/5 to 90/10. When the mass ratio between the component (A) and the component (B) in the curing agent is within the range, the curability of a water-based epoxy resin composition to be obtained is good, and the hardness and chemical resistance, particularly salt water corrosion resistance, of a coating film are excellent. Further, the water resistance, impact resistance, and appearance of a coating film of an epoxy resin composition to be obtained are maintained or better than when the component (A) is used alone as a curing agent.

When a small amount of the component (B) is blended with the component (A), particularly when the mass ratio between the component (A) and the component (B) is in the range of 95/5 to 90/10, the curing agent of the present invention dramatically improves curability and the chemical resistance of a coating film as compared with when the component (A) is used alone as a curing agent.

The curing agent of the present invention may further contain a curing agent component other than the component (A) and the component (B). Examples of the "other curing agent component" include polyamine compounds or modified products thereof other than the component (A) and the component (B).

Further, a well-known curing accelerator, a non-reactive diluent, or the like may also be blended with the curing agent of the present invention, within a range not impairing the effects of the present invention. Examples of the curing accelerator include tris(dimethylaminomethyl)phenol, benzyl alcohol, salicylic acid, triphenyl phosphite, styrenated phenol, bisphenol A, N,N'-bis(3-(dimethylamino)propyl) urea, and mercaptan-terminated polysulfide compounds such as "Thiokol LP-3" (manufactured by Toray Fine Chemicals Co., Ltd.).

However, the total content of the component (A) and the component (B) in the curing agent of the present invention is preferably 70% by mass or more, more preferably 80% by mass or more, and even more preferably 90% by mass or more, from the viewpoint of obtaining the effects of the present invention. The upper limit is 100% by mass.

An active hydrogen equivalent weight (AHEW) of the curing agent of the present invention is preferably 800 or less, more preferably 500 or less, and even more preferably 400 or less. When the AHEW of the curing agent is lower, a higher curability is exhibited even when the blending amount to the water-based epoxy resin composition is small. On the other hand, the AHEW of the curing agent is preferably 45 or more, and more preferably 70 or more, from the viewpoint of obtaining excellent hardness and chemical resistance in a coating film of a water-based epoxy resin composition to be obtained. Further, when the curing agent is a solution or a dispersion, the as-is active hydrogen equivalent weight is preferably within the range.

[Water-Based Epoxy Resin Composition]

The water-based epoxy resin composition of the present invention includes the above-described curing agent for a water-based epoxy resin of the present invention and a water-based epoxy resin. As described above, it is preferred that an epoxy resin emulsion is used as the water-based epoxy resin. Examples of the epoxy resin emulsion include emulsions obtained by emulsifying and dispersing an epoxy resin in water.

It is more preferred that a water-based epoxy resin used in the present invention is an epoxy resin emulsion containing an epoxy resin, an emulsifier, and water.

The epoxy resin used in the epoxy resin emulsion may be an epoxy resin that has a glycidyl group which reacts with an active hydrogen in the curing agent of the present invention and that can emulsify and disperse in water. From the viewpoint of the hardness, water resistance, and chemical resistance of a coating film to be obtained, an epoxy resin including an aromatic ring or an alicyclic structure in the molecule thereof is preferred.

Specific examples of the epoxy resin used in the epoxy resin emulsion include at least one resin selected from the group consisting of an epoxy resin having a glycidylamino group derived from metaxylylene diamine, an epoxy resin having a glycidylamino group derived from 1,3-bis(aminomethyl)cyclohexane, an epoxy resin having a glycidylamino group derived from diaminodiphenylmethane, an epoxy resin having a glycidylamino group and a glycidyloxy group derived from paraaminophenol, an epoxy resin having a glycidyloxy group derived from bisphenol A, an epoxy resin having a glycidyloxy group derived from bisphenol F, an epoxy resin having a glycidyloxy group derived from phenol novolac, and an epoxy resin having a glycidyloxy group derived from resorcinol.

Among them, from the viewpoint of the hardness, water resistance, and chemical resistance of a coating film to be obtained, it is more preferred that the epoxy resin used in the epoxy resin emulsion includes, as a main component, at least one selected from the group consisting of an epoxy resin having a glycidylamino group derived from metaxylylene diamine, an epoxy resin having a glycidyloxy group derived from bisphenol A, and an epoxy resin having a glycidyloxy group derived from bisphenol F, it is even more preferred that the epoxy resin includes, as a main component, at least one selected from the group consisting of an epoxy resin having a glycidyloxy group derived from bisphenol A and an epoxy resin having a glycidyloxy group derived from bisphenol F, and it is still even more preferred that the epoxy resin includes, as a main component, an epoxy resin having a glycidyloxy group derived from bisphenol A. Here, "main component" means that other components may be included without departing from the gist of the present invention, and means preferably 50 to 100% by mass, more preferably 70 to 100% by mass, and even more preferably 90 to 100% by mass of the total components.

The epoxy resin used in the epoxy resin emulsion may be either a solid epoxy resin or a liquid epoxy resin. In the present invention, "solid epoxy resin" means an epoxy resin which is a solid at room temperature (25° C.), and "liquid epoxy resin" means an epoxy resin which is a liquid at room temperature (25° C.).

An epoxy equivalent weight of an epoxy resin used in an epoxy resin emulsion is preferably 150 g/equivalent weight or more, from the viewpoint of the hardness, water resistance and chemical resistance of a coating film of a water-based epoxy resin composition to be obtained, and is preferably 1,000 g/equivalent weight or less and more preferably 800 g/equivalent weight or less, from the viewpoint of the low viscosity or the curability of the water-based epoxy resin composition.

In the case of an epoxy resin emulsion in which an epoxy resin is dispersed in a dispersion medium in the presence of an emulsifier, it is preferred that an epoxy equivalent weight of a component (that is, solid content including the epoxy resin and the emulsifier) in which the dispersion medium is removed from the emulsion is also within the range.

The epoxy resins used in the epoxy resin emulsion may be used alone and may be used in combination of two or more thereof.

The concentration of the epoxy resin in the epoxy resin emulsion is not particularly limited, but is preferably 30% by mass or more and more preferably 40% by mass or more, and typically 80% by mass or less.

For the emulsifier used in the epoxy resin emulsion, an HLB defined by the Griffin method is preferably 8.0 to 20.0, more preferably 10.0 to 20.0, and even more preferably 12.0 to 20.0. When the HLB of the emulsifier is in the range, the epoxy resin is more easily emulsified in water, and a coating film of a water-based epoxy resin composition to be obtained has excellent hardness, water resistance, and chemical resistance.

Here, an HLB (Hydrophile-Lypophile Balance) is a value showing the affinity in water and oil which are an emulsifier, and may be obtained from the following equation by the Griffin method.

$$HLB=20\times[(\text{a molecular weight of a hydrophilic group included in an emulsifier})/(\text{a molecular weight of the emulsifier})]$$

As the emulsifier used in the epoxy resin emulsion, it is possible to use any of a nonionic emulsifier, an anionic emulsifier, a cationic emulsifier, an amphoteric emulsifier, and a reactive group-containing emulsifier having a reactive group. At least one selected from the group consisting of nonionic emulsifiers, anionic emulsifiers, and reactive group-containing emulsifiers is preferable, and nonionic emulsifiers are more preferable, from the viewpoint that there is a broad curing agent selection range.

Examples of the nonionic emulsifier include a polyether-based compound, an ester-based compound, an alkanolamide-based compound, and the like. Among them, a polyether-based compound is preferred, and a nonionic compound having a polyoxyalkylene structure is more preferred.

Examples of the nonionic compound having a polyoxyalkylene structure include polyalkylene glycols, such as polyethylene glycol, polypropylene glycol, and polyoxyethylene polyoxypropylene glycol, or polyalkylene glycol copolymers; polyoxyalkylene alkyl ethers such as polyoxyethylene myristyl ether and polyoxyethylene octyldodecyl ether; polyoxyalkylene aryl ethers such as polyoxyethylene phenyl ether, polyoxyethylene styrenated phenyl ether (including various polyoxyethylene styrenated phenyl ethers such as polyoxyethylene monostyrenated phenyl ether, polyoxyethylene distyrenated phenyl ether, and polyoxyethylene tristyrenated phenyl ether), polyoxyethylene naphthyl ether, polyoxyethylene bisphenol A ether, and polyoxyethylene bisphenol F ether; polyoxyalkylene alkyl aryl ethers such as polyoxyethylene benzyl ether and polyoxyethylene dodecyl phenyl ether; and the like.

Among them, from the viewpoint of easily emulsifying an epoxy resin in water and improving the hardness, water resistance, and chemical resistance of a coating film of a water-based epoxy resin composition to be obtained, one or more selected from the group consisting of polyoxyalkylene aryl ethers and polyoxyalkylene alkyl aryl ethers is preferable, one or more selected from the group consisting of polyoxyethylene aryl ethers and polyoxyethylene alkyl aryl ethers is more preferable, a polyoxyethylene aryl ether is even more preferable, a polyoxyethylene styrenated phenyl ether is still even more preferable, and a polyoxyethylene distyrenated phenyl ether is still even more preferable.

Preferred examples of the nonionic emulsifier that may be used in the epoxy resin emulsion include commercially available products such as NOIGEN series and Epan series manufactured by Daiichi Kogyo Seiyaku Co., Ltd., and BLAUNON series manufactured by Aoki Oil Industrial Co., Ltd.

Examples of the anionic emulsifier include: alkylsulfates such as sodium lauryl sulfate; polyoxyethylene alkyl ether sulfates such as sodium polyethoxyethylene lauryl ether sulfate; alkyl aryl sulfonates such as alkyl benzene sulfonate; alkane sulfonates; fatty acid salts such as sodium laurate; polyoxyethylene alkyl ether carboxylates such as polyoxyethylene alkyl ether acetate; sulfosuccinates such as dialkyl sulfosuccinate; and the like.

Examples of the cationic emulsifier include alkylamine salts, alkyl quaternary ammonium salts, and the like. In addition, examples of the amphoteric emulsifier include alkyl betaine-based compounds such as alkyl dimethylaminoacetic acid betaine, fatty acid amidopropyl betaine, and alkyl hydroxy sulfobetaine, and the like.

Examples of the reactive group-containing emulsifier include an epoxy group, a vinyl group, and the like. From the viewpoint of improving the hardness, water resistance, chemical resistance, and appearance of a coating film of a water-based epoxy resin composition to be obtained, the reactive group-containing emulsifier is preferably an epoxy group-containing emulsifier.

Preferred examples of the epoxy group-containing emulsifier include an epoxy group-containing polymer such as an acrylic polymer having an epoxy group and an acryl-styrene-based polymer having an epoxy group.

An epoxy equivalent weight of the epoxy group-containing emulsifier is preferably 150 to 4,000 g/equivalent weight, more preferably 300 to 2,000 g/equivalent weight, and even more preferably 300 to 1,500 g/equivalent weight.

Preferred examples of the epoxy group-containing emulsifier which may be used in the epoxy resin emulsion include commercially available products such as MARPROOF series manufactured by NOF Corporation and Alpha Resin series "W-10" and "W-12" manufactured by Alpha-Kaken Co., Ltd.

The emulsifiers may be used either alone or in combination of two or more thereof.

Among the above-described emulsifiers, at least one selected from the group consisting of polyoxyalkylene aryl ethers and polyoxyalkylene alkyl aryl ethers having an HLB defined by the Griffin method of 12.0 to 20.0 is preferable, one or more selected from the group consisting of a polyoxyethylene aryl ether and a polyoxyethylene alkyl aryl ether having an HLB of 12.0 to 20.0 is more preferable, a polyoxyethylene aryl ether having an HLB of 12.0 to 20.0 is even more preferable, a polyoxyethylene styrenated phenyl ether having an HLB of 12.0 to 20.0 is still even more preferable, and a polyoxyethylene distyrenated phenyl ether having an HLB of 12.0 to 20.0 is still even more preferable.

The content of the emulsifier in the epoxy resin emulsion is preferably 0.1 to 40 parts by mass, more preferably 0.5 to 30 parts by mass, and even more preferably 1 to 20 parts by mass, with respect to 100 parts by mass of the epoxy resin. When the emulsifier is 0.1 parts by mass or more with respect to 100 parts by mass of the epoxy resin, the emulsion stability of the epoxy resin is good, and when the emulsifier is 40 parts by mass or less, the hardness, water resistance, chemical resistance, appearance, and the like of a coating film of a water-based epoxy resin composition to be obtained can be well maintained.

The epoxy resin emulsion which is a water-based epoxy resin may contain components other than the epoxy resin, the emulsifier, and water, and the total content of the epoxy resin, the emulsifier, and water is preferably 70% by mass or more, more preferably 80% by mass or more, and even more preferably 90% by mass or more, and the upper limit thereof is 100% by mass.

Example of components other than the epoxy resin, the emulsifier, and water include the aqueous solvents described above as examples in relation to the polyamide amine-based curing agent (a1).

Examples of a commercially available epoxy resin emulsion which may be used as a water-based epoxy resin include commercially available products, such as "W2801", "W2821R70", "W3435R67", "W8735R70", "W1155R55", and "W5654R45", which are jER series manufactured by Mitsubishi Chemical Corporation, "EM-101-50" manufactured by ADEKA Corporation, "EPICLON EXA-8610" manufactured by DIC Corporation, "PZ 3901", "PZ 3921", and "PZ 3961-1", which are Araldite series manufactured by Huntsman Advanced Materials, Inc., "DER 915" and "DER 917" manufactured by Olin Corporation, and "Resin 3520-WY-55" and "Resin 6520-WH-53", which are EPIREZ series manufactured by Hexion Specialty Chemicals.

The content of the curing agent in the water-based epoxy resin composition of the present invention is an amount in which the ratio of the number of active hydrogens in the curing agent and the number of epoxy groups in the water-based epoxy resin is preferably 1/0.5 to 1/2, more preferably 1/0.7 to 1/2, even more preferably 1/0.8 to 1/1.5, still even more preferably 1/0.8 to 1/1.2, still even more preferably 1/0.9 to 1/1.1, and even more preferably 1/1.

In the water-based epoxy resin composition of the present invention, a modifying component such as a filler and a plasticizer, a flow control component such as a thixotropic agent, and other components such as a pigment, a leveling agent, a tackifier may also be included according to the use.

A preparation method of the water-based epoxy resin composition of the present invention is not particularly limited, and the curing agent, the water-based epoxy resin, and other components, if necessary, may be mixed and prepared by using well-known methods and apparatuses.

When an epoxy resin emulsion containing an epoxy resin as the water-based epoxy resin, an emulsifier, and water is used, a water-based epoxy resin composition may be formulated by firstly blending and mixing the curing agent with the epoxy resin and the emulsifier which are raw materials for the epoxy resin emulsion, continuously adding water thereto dividedly, and mixing the mixture. By this operation, it is possible to emulsify and disperse the epoxy resin in water, and simultaneously formulate a water-based epoxy resin composition, so that it is possible to obtain a composition having a good dispersed state of the epoxy resin.

The content of water in the water-based epoxy resin composition of the present invention is 10% by mass or more, preferably 15% by mass or more, and more preferably 20% by mass or more. The upper limit of the content of water may be appropriately adjusted according to the concentration of the water-based epoxy resin composition, but is typically 80% by mass or less, and preferably 70% by mass or less.

Further, it is preferred that the water-based epoxy resin composition of the present invention does not contain an organic solvent, and the content thereof is preferably 10% by mass or less, more preferably 5% by mass or less, and even more preferably 2% by mass or less. In particular, the content of the organic solvent other than the above-described aqueous solvent is preferably within the above-described range.

<Use>

The water-based epoxy resin composition of the present invention has good curability, and the hardness and chemical resistance, particularly salt water corrosion resistance, of a coating film to be obtained are excellent. Therefore, the water-based epoxy resin composition of the present invention can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like. The paint for corrosion resistance is used as a paint for ships, bridges, buildings such as factories, and other land and sea iron structures, for example.

[Cured Product]

A cured product of the water-based epoxy resin composition of the present invention (hereinafter, also simply referred to as "the cured product of the present invention") is a cured product obtained by curing the above-described water-based epoxy resin composition of the present invention by a well-known method. The curing conditions of the water-based epoxy resin composition are appropriately selected according to the use and the form, and are not particularly limited.

The form of the cured product of the present invention is also not particularly limited, and may be selected according to the use. For example, when the water-based epoxy resin composition is a paint for corrosion resistance, a cured product of the water-based epoxy resin composition is usually a film-like cured product. It is preferred that the cured product of the present invention is a film-like cured product because excellent hardness and chemical resistance, particularly salt water corrosion resistance, can be exhibited.

EXAMPLES

Hereinafter, the present invention will be described in detail with reference to Examples and Comparative Examples, but the present invention is not limited to the following Examples. Further, the curing agent for a water-based epoxy resin and the water-based epoxy resin composition were evaluated by the following methods.

(Calculation of Active Hydrogen Equivalent Weight (AHEW))

Among the curing agents for a water-based epoxy resin in each example, the active hydrogen equivalent weight (AHEW) of the curing agent composed of two curing agent components was calculated by the calculation formula to be described below.

When the AHEW of a curing agent obtained by mixing a curing agent or reaction product whose AHEW is X and a curing agent or reaction product whose AHEW is Y at a mass ratio A:B is Z, $$Z=[(A+B)XY]/(AY+BX)$$

(Dry to the Touch)

A zinc phosphate-treated iron plate (manufactured by PALTECH Co., Ltd.; SPCC-SD PB-N144 0.8×70×150 mm) was used as a base material. A water-based epoxy resin composition of each example was applied using an applicator onto the base material to form a coating film (thickness immediately after application: 200 μm). This coating film was kept under the conditions of 23° C. and 50% R.H., and after 1, 2, and 7 days passed, was evaluated by finger contact according to the following criteria.

Ex: Excellent (there is no sticking of the coating film even when the thumb is pressed with a force of about 50 N, and no fingerprints remain)

G: Good (there is no sticking of the coating film even when the thumb is pressed with a force of about 50 N, but fingerprints remain after finger contact)

F: Fair (there is sticking of the coating film when the thumb is pressed with a force of about 50 N)

P: Poor (there is sticking of the coating film when the thumb is pressed with a force of about 5 N)

(Pencil Hardness)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H., and after 1, 2, and 7 days passed, the pencil hardness was measured in accordance with JIS K5600-5-4:1999.

(Water Resistance Spot Test)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H., and after 1, 2, and 7 days passed, 2 to 3 drops of pure water were dropped on the surface of the coating film with a dropper, and the portion was covered with a 50 mL screw tube bottle. After 24 hours passed, water was wiped off, and the appearance was observed visually and evaluated according to the following criteria.

Ex: Excellent (no change at all)

G: Good (slight change, but no problem with use)

F: Fair (some whitening)

P: Poor (whitening)

(Curing Rate)

The water-based epoxy resin composition in each example was applied onto a glass plate (manufactured by Taiyu Machinery Co., Ltd., 25×348×2.0 mm) under the conditions of 23° C. and 50% R.H., by using an applicator of 76 μm, thereby forming a coating film. The glass plate on which the coating film was formed was set on a paint drying time measuring instrument (manufactured by Taiyu Machinery Co., Ltd.), the striations when the needle of the measuring instrument scratched the surface of the coating film were observed, and the time to reach each drying step (Set to Touch, Dust Free, and Dry Through) was measured according to the following criteria. A shorter time indicates a higher curing rate.

Set to Touch: time taken until when traces of the needle start to remain on the glass plate Dust Free: time taken until when the needle emerges from the middle of the coating film onto the surface of the coating film Dry Through: time taken until when no traces of the needle remain on the coating film (Appearance of Coating Film)

A water-based epoxy resin composition of each example was applied onto a base material (zinc phosphate-treated iron plate) in the same manner as described above to form a coating film (thickness immediately after application: 200 μm). This coating film was kept under the conditions of 23° C. and 50% R.H. The appearance thereof after 7 days passed was observed visually to evaluate transparency, smoothness, and glossiness according to the following criteria.

<Transparency>

Ex: Excellent (there is no turbidity)

G: Good (there is slight turbidity, but there is no problem with use)

F: Fair (there is slight white turbidity)

P: Poor (white turbidity)

<Smoothness>

Ex: Excellent (there is no unevenness)

G: Good (there is slight unevenness, but there is no problem with use)

F: Fair (there is some unevenness)

P: Poor (there is cissing or unevenness on the whole surface)

<Glossiness>

Ex: Excellent (there is glossiness)

G: Good (slight deterioration in glossiness, but no problem with use)

F: Fair (little glossiness)

P: Poor (no glossiness)

(DuPont Impact Test)

A water-based epoxy resin composition of each example was applied onto a base material (zinc phosphate-treated iron plate) in the same manner as described above to form a coating film (thickness immediately after application: 200 µm). This coating film was kept under the conditions of 23° C. and 50% R.H, and the coating film after 7 days passed was subjected to an impact test (weight drop resistance test) by the DuPont method in accordance with JIS K5600-5-3: 1999.

Using a DuPont drop impact tester (manufactured by MYS-Tester Company Limited), a weight of 500 g was dropped from each of a height of 300 mm, 200 mm, and 100 mm onto the coating film surface, and the height at which the impact was withstood is shown in Table 1.

(Chemical Resistance)

A coating film was formed (thickness immediately after coating: 200 µm) by applying a water-based epoxy resin composition of each example on a base material (zinc phosphate-treated iron plate) in the same manner as described above, and a test specimen was produced by sealing a non-coated part with a rust preventive paint ("Million Primer" and "Million Clear", manufactured by Kansai Paint Co., Ltd.). This test specimen was kept under the conditions of 23° C. and 50% R.H., and after 14 days passed, the chemical resistance of the test specimen was evaluated.

<5% Salt Water Spray>

For the salt water spray test, after the test specimen was placed in a salt water spray tester ("STP-90" manufactured by Suga Test Instruments Co., Ltd., in-bath temperature 35° C.), and continuously sprayed for 2 weeks with salt water (concentration 5% by mass), the appearance thereof was observed visually after 1 and 2 weeks and evaluated according to the following criteria. Further, the presence or absence of spot rust was checked by visually observing the surface of the base material in contact with the coating film.

Ex: No spot rust on the base material and no change in coating film appearance

G: A small amount of spot rust on the base material, but there is no problem with use F: There is spot rust on the base material P: There is a large amount of spot rust on the base material <Crosscut Test>

A coating film was formed (thickness immediately after coating: 200 µm) by applying a water-based epoxy resin composition of each example on a base material (zinc phosphate-treated iron plate) in the same manner as described above. A test specimen was produced having two diagonally-intersecting incisions of 50 mm in length cut using a cutter knife in accordance with JIS K5600-7-9:2006 on the coating film surface after 14 days of storage under the conditions of 23° C., 50% R.H.

After the test specimen was placed in a salt water spray tester ("STP-90" manufactured by Suga Test Instruments Co., Ltd., in-bath temperature 35° C.), and continuously sprayed for 2 weeks with salt water (concentration 5% by mass), the appearance thereof was observed visually after two weeks passed and the presence or absence of peeling of the coating film was evaluated.

Example 1 (Production of Water-Based Epoxy Resin Composition)

A water-based emulsion of a solid epoxy resin having a glycidyloxy group derived from bisphenol A ("Araldite PZ 3961-1" manufactured by Huntsman Advanced Materials, epoxy equivalent weight (solid content): 503 g/equivalent weight, solid content concentration: 53% by mass) was used as a main agent.

As a curing agent for a water-based epoxy resin, a polyamide amine-based curing agent ("Aradur 3986" manufactured by Huntsman Advanced Materials, solid component concentration: 40% by mass, dispersion medium (main component): water, AHEW (as is): 415) as a component (a1) and a reaction product of styrene and metaxylylenediamine (MXDA) ("Gaskamine 240" manufactured by Mitsubishi Gas Chemical Company, Inc., AHEW: 103) as a component (b1) were used. The curing agent for a water-based epoxy resin was prepared by mixing the component (a1) and the component (b1) in a ratio of (a1)/(b1)=95/5 as an as-is mass ratio.

A water-based epoxy resin composition was obtained by blending and stirring such that the number of epoxy groups in the water-based epoxy resin, which is the main agent, and the number of active hydrogens in the curing agent were 1/1.

The evaluation was performed by using the obtained water-based epoxy resin composition. The results are shown in Table 1.

Example 2

A curing agent for a water-based epoxy resin was prepared by mixing the above-described component (a1) and component (b1) in a ratio of 90/10 as an as-is mass ratio. Using this curing agent, a water-based epoxy resin composition was prepared in the same manner as in Example 1 and the evaluations described above were performed. The results are shown in Table 1.

Example 3

A curing agent for a water-based epoxy resin was prepared by mixing the above-described component (a1) and component (b1) in a ratio of 80/20 as an as-is mass ratio. Using this curing agent, a water-based epoxy resin composition was prepared in the same manner as in Example 1 and the evaluations described above were performed. The results are shown in Table 1.

Example 4

A curing agent for a water-based epoxy resin was prepared by mixing the above-described component (a1) and component (b1) in a ratio of 70/30 as an as-is mass ratio. The evaluation was performed by formulating a water-based epoxy resin composition in the same manner as in Example 1 using the curing agent. The results are shown in Table 1.

Example 5

As a curing agent for a water-based epoxy resin, a polyamide amine-based curing agent ("Aradur 3986" manufactured by Huntsman Advanced Materials) as a component (a1) and a reaction product of epichlorohydrin and MXDA ("Gaskamine 328" manufactured by Mitsubishi Gas Chemical Company, Inc., AHEW: 55) as a component (b2) were used. The curing agent for a water-based epoxy resin was prepared by mixing the component (a1) and the component (b2) in a ratio of (a1)/(b2)=95/5 as an as-is mass ratio. Using this curing agent, a water-based epoxy resin composition was prepared in the same manner as in Example 1 and the evaluations described above were performed. The results are shown in Table 1.

Examples 6 to 9

A curing agent for a water-based epoxy resin and a water-based epoxy resin composition were prepared in the same manner as in Example 5, except that the mass ratio of the component (a1) to the component (b2) in Example 5 was changed to that shown in Table 1, and the evaluations described above were performed. The results are shown in Table 1.

Comparative Example 1

A water-based epoxy resin composition was prepared in the same manner as in Example 1, except that only the polyamide amine-based curing agent ("Aradur 3986" manufactured by Huntsman Advanced Materials), which is the component (a1), was used as a curing agent for a water-based epoxy resin in Example 1, and the evaluations described above were performed. The results are shown in Table 1.

TABLE 1

| | | | | Example 1 | Example 2 | Example 3 | Example 4 | Example 5 | Example 6 |
|---|---|---|---|---|---|---|---|---|---|
| Composition blend | Water-based epoxy resin | | | Araldite PZ 3961-1 | | | | | |
| | Curing agent | (a1) Aradur 3986 (parts by mass) *1) | | 95 | 90 | 80 | 70 | 95 | 90 |
| | | (b1) G-240 (parts by mass) *1) | | 5 | 10 | 20 | 30 | — | — |
| | | (b2) G-328 (parts by mass) *1) | | — | — | — | — | 5 | 10 |
| | | AHEW *2) | | 360 | 319 | 258 | 217 | 313 | 251 |
| Solid content concentration (% by mass) of water-based epoxy resin composition | | | | 50 | 51 | 53 | 54 | 51 | 52 |
| 23° C. 50% R.H. evaluation | | | | | | | | | |
| Dry to the touch (after 1/2/7 days passed) | | | | Ex/Ex/Ex | Ex/Ex/Ex | Ex/Ex/Ex | Ex/Ex/Ex | Ex/Ex/Ex | Ex/Ex/Ex |
| Pencil hardness (after 1/2/7 days passed) | | | | F/H/H | F/H/H | F/H/H | F/H/H | H/H/H | H/H/H |
| Water resistance spot (after 1/2/7 days passed) | | | | F/F/F | F/F/F | F/F/F | F/F/F | F/F/F | F/F/G |
| Curing rate | | Set to Touch (time: min) | | 0:01 | 0:30 | 0:30 | 0:01 | 0:01 | 0:01 |
| | | Dust Free (time: min) | | 1:30 | 1:45 | 2:15 | 2:15 | 1:30 | 1:30 |
| | | Dry Through (time: min) | | 3:45 | 4:45 | 7:30 | 6:00 | 3:15 | 2:30 |
| Coating film appearance (transparency/smoothness/glossiness) | | | | Ex/G/Ex | Ex/G/Ex | Ex/G/Ex | Ex/G/Ex | Ex/G/Ex | Ex/G/Ex |
| Dupont impact test (mm) | | | | 100 | 100 | 100 | 200 | 200 | 300 |
| Chemical resistance | | 5% Salt water spray (after 1/2 weeks passed) | | G/G | Ex/G | Ex/G | Ex/G | G/G | G/F |
| | | Crosscut (after 2 weeks passed) | | no peeling | no peeling | no peeling | no peeling | no peeling | no peeling |

| | | | | Example 7 | Example 8 | Example 9 | Comparative Example 1 |
|---|---|---|---|---|---|---|---|
| Composition blend | Water-based epoxy resin | | | | | | |
| | Curing agent | (a1) Aradur 3986 (parts by mass) *1) | | 80 | 70 | 90 | 100 |
| | | (b1) G-240 (parts by mass) *1) | | — | — | 5 | — |
| | | (b2) G-328 (parts by mass) *1) | | 20 | 30 | 5 | — |
| | | AHEW *2) | | 178 | 140 | 281 | 415 |
| Solid content concentration (% by mass) of water-based epoxy resin composition | | | | 53 | 54 | 52 | 49 |
| 23° C. 50% R.H. evaluation | | | | | | | |
| Dry to the touch (after 1/2/7 days passed) | | | | Ex/Ex/Ex | Ex/Ex/Ex | Ex/Ex/Ex | Ex/Ex/Ex |
| Pencil hardness (after 1/2/7 days passed) | | | | H/H/H | H/H/H | F/F/H | F/F/H |
| Water resistance spot (after 1/2/7 days passed) | | | | F/F/G | F/F/F | F/F/F | F/F/F |
| Curing rate | | Set to Touch (time: min) | | 0:01 | 0:01 | 0:01 | 0:45 |
| | | Dust Free (time: min) | | 1:30 | 1:30 | 1:30 | 1:15 |
| | | Dry Through (time: min) | | 2:30 | 2:00 | 3:15 | >24 |

TABLE 1-continued

| | | | | | |
|---|---|---|---|---|---|
| Coating film appearance (transparency/smoothness/glossiness) | | Ex/G/Ex | Ex/G/Ex | Ex/G/Ex | Ex/G/Ex |
| Dupont impact test (mm) | | 300 | 200 | 200 | 100 |
| Chemical resistance | 5% Salt water spray (after 1/2 weeks passed) | G/F | F/P | G/F | P/P |
| | Crosscut (after 2 weeks passed) | no peeling | no peeling | no peeling | no peeling |

*1) As-is blending amount (parts by mass)
*2) As-is AHEW

The components used in Table 1 are shown below.

<Water-Based Epoxy Resin>

Araldite PZ 3961-1:

A water-based emulsion of a solid epoxy resin having a glycidyloxy group derived from bisphenol A (manufactured by Huntsman Advanced Materials, epoxy equivalent weight (solid content): 503 g/equivalent weight, solid content concentration: 53% by mass, water content: 40% by mass, methoxypropanol content: 7% by mass)

<Curing Agent Component for Water-Based Epoxy Resin>

(a1): Aradur 3986 (polyamide amine-based curing agent, manufactured by Huntsman Advanced Materials, solid content concentration: 40% by mass, dispersion medium (main component): water, AHEW (as is): 415)

(b1): Gaskamine 240 (reaction product of styrene and MXDA, manufactured by Mitsubishi Gas Chemical Company, Inc., MXDA content: <1% by mass, content of a compound represented by the following formula (2-1): 49% by mass, AHEW: 103)

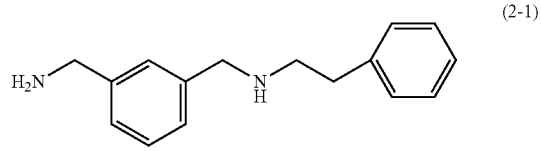 [SMILES: NCc1cccc(CNCCc2ccccc2)c1]

(2-1)

(b2): GASKAMINE 328 (a reaction product including a reaction product of epichlorohydrin and MXDA, manufactured by Mitsubishi Gas Chemical Company, Inc., content of MXDA: 26.7% by mass, content of a compound represented by the following formula (3-1): 73.3% by mass (n is a number of 1 to 12 and content of a compound with n=1 is 20.9% by mass in (b2)), and AHEW: 55)

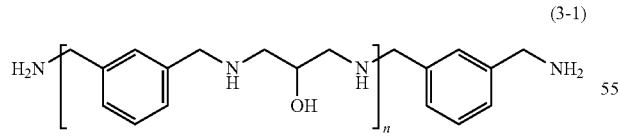

(3-1)

As shown in Table 1, as compared with the water-based epoxy resin composition of Comparative Example 1, the water-based epoxy resin compositions of Examples 1 to 9 had a better curing rate (particularly Dry Through time) and salt water spray resistance of the coating film, and the hardness of the coating film was also better. Further, the water resistance and the DuPont impact strength were maintained or improved while maintaining the excellent coating film appearance.

INDUSTRIAL APPLICABILITY

By using a curing agent for a water-based epoxy resin of the present invention, a water-based epoxy resin composition can be provided, which does not contain a solvent, is also suitable in terms of environment or safety, has good curability, and is also excellent in coating film performance such as hardness and chemical resistance, particularly salt water corrosion resistance. The water-based epoxy resin composition can be suitably used for various paints such as a paint for corrosion resistance, as well as for an adhesive, a floor material, a sealant, a polymer cement mortar, a gas barrier coating, a primer, a screed, a top coat, a sealing material, a crack repair material, a concrete material, and the like.

The invention claimed is:

1. A water-based epoxy resin composition comprising:
    a water-based epoxy resin, and
    a curing agent for the water-based epoxy resin, comprising the following component (A) and component (B):
    (A): a polyamide amine-based curing agent (a1);
    (B): at least one selected from the group consisting of a reaction product (b1) of styrene and an amine compound represented by the following formula (1), and a reaction product (b2) of epichlorohydrin and an amine compound represented by the following formula (1):

$H_2N-CH_2-A-CH_2-NH_2$ (1)

wherein A is a 1,2-phenylene group, a 1,3-phenylene group, or a 1,4-phenylene group, and
    wherein a content ratio between the component (A) and the component (B) is 99/1 to 70/30 by mass ratio.

2. The water-based epoxy resin composition according to claim 1, wherein the reaction product (b1) comprises 10% by mass or more of a compound represented by the following formula (2):

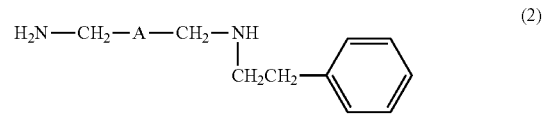

(2)

wherein A is a 1,2-phenylene group, a 1,3-phenylene group, or a 1,4-phenylene group.

3. The water-based epoxy resin composition according to claim 1, wherein the reaction product (b2) comprises a compound represented by the following formula (3) as a main component:

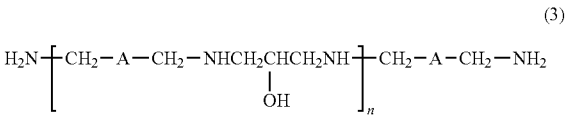

(3)

wherein A is a 1,2-phenylene group, a 1,3-phenylene group, or a 1,4-phenylene group, and n is a number of 1 to 12.

4. The water-based epoxy resin composition according to claim 1, wherein the content ratio between the component (A) and the component (B) is 95/5 to 90/10 by mass ratio.

5. A paint for corrosion resistance comprising the water-based epoxy resin composition according to claim 1.

6. A cured product of the water-based epoxy resin composition according to claim 1.

7. The water-based epoxy resin composition according to claim 1, wherein the component (B) is a reaction product (b1) of styrene and an amine compound represented by the formula (1).

\* \* \* \* \*